(12) United States Patent
Willocq et al.

(10) Patent No.: US 9,403,920 B2
(45) Date of Patent: Aug. 2, 2016

(54) MODIFIED CATALYST SUPPORTS

(75) Inventors: Christopher Willocq, Bousval (BE);
Aurélien Vantomme, Bois-d'Haine (BE); Martine Slawinski, Nivelles (BE)

(73) Assignee: Total Research & Technology Feluy, Seneffe (BE)

( * ) Notice: Subject to any disclaimer, the term of this patent is extended or adjusted under 35 U.S.C. 154(b) by 680 days.

(21) Appl. No.: 13/816,100

(22) PCT Filed: Aug. 16, 2011

(86) PCT No.: PCT/EP2011/064093
§ 371 (c)(1),
(2), (4) Date: Apr. 25, 2013

(87) PCT Pub. No.: WO2012/020145
PCT Pub. Date: Feb. 16, 2012

(65) Prior Publication Data
US 2013/0225772 A1    Aug. 29, 2013

(30) Foreign Application Priority Data
Aug. 13, 2010  (EP) ..................... 10172815

(51) Int. Cl.
| | | |
|---|---|---|
| *C08F 4/76* | (2006.01) | |
| *C08F 4/64* | (2006.01) | |
| *C08F 210/00* | (2006.01) | |
| *B01J 31/14* | (2006.01) | |
| *B01J 31/16* | (2006.01) | |
| *B01J 31/22* | (2006.01) | |
| *C08F 4/659* | (2006.01) | |
| *C08F 4/6592* | (2006.01) | |
| *C08F 110/02* | (2006.01) | |

(52) U.S. Cl.
CPC ............... *C08F 4/76* (2013.01); *C08F 210/00* (2013.01); *B01J 31/143* (2013.01); *B01J 31/1608* (2013.01); *B01J 31/1616* (2013.01); *B01J 31/2295* (2013.01); *B01J 2531/46* (2013.01); *B01J 2531/48* (2013.01); *B01J 2531/49* (2013.01); *B01J 2531/56* (2013.01); *C08F 4/65912* (2013.01); *C08F 4/65927* (2013.01); *C08F 110/02* (2013.01); *Y02P 20/52* (2015.11)

(58) Field of Classification Search
CPC .............. C08F 4/76; C08F 4/025; C08F 2/02; C08F 2/34; C08F 10/02; C08F 10/06
See application file for complete search history.

(56) References Cited

U.S. PATENT DOCUMENTS 4,130,505 A * 12/1978 Nasser, Jr. ............... B01J 23/26
502/203
4,981,831 A    1/1991 Knudsen et al.
(Continued)

FOREIGN PATENT DOCUMENTS

EP     1 072 618 A1 *  1/2001  ............. C08F 10/02

OTHER PUBLICATIONS

Fisch et al. Applied Catalysis A: General, 2009, 354, 88-101.*
(Continued)

*Primary Examiner* — Rip A Lee
(74) *Attorney, Agent, or Firm* — Albert Shung

(57) ABSTRACT

A supported catalyst system includes a coprecipitated silica- and titania-containing support, alumoxane, and a metallocene. The supported catalyst system has a Ti content of at least 0.1 wt %.

17 Claims, 1 Drawing Sheet

(56) References Cited

U.S. PATENT DOCUMENTS

| | | | |
|---|---|---|---|
| 5,032,562 | A | 7/1991 | Lo et al. |
| 5,124,418 | A | 6/1992 | Welborn, Jr. |
| 5,604,170 | A | 2/1997 | Sano et al. |
| 6,395,666 | B1 | 5/2002 | McDaniel et al. |
| 7,271,122 | B2 * | 9/2007 | Bodart .................. C08F 10/02 502/103 |
| 7,326,756 | B2 * | 2/2008 | Arjunan ................. C08F 10/06 526/127 |
| 2003/0232716 | A1 | 12/2003 | McDaniel et al. |

OTHER PUBLICATIONS

Jongsomjit et al. Catalysis Letters, 2005, 100, 139-146.*
Jongsomjit et al. Molecules, 2005, 10, 672-679.*
Fisch A G et al. Immobilization of metallocene within silica-titania by a non-hyrolytic sol gel method. Applied Catalysis A: General, Elsevier Science, vol. 354 No. 1-2. Amsterdam, NL. Feb. 15, 2009. p. 88-101.
Jongsomjit B et al. Catalystic Activity During Copolymerization of Ethylene and 1-Hexene via Mixed Ti02/Si02-Supported MAO Catalyst. Molecules, Molecular Diversity Preservation International, vol. 10. Basel, CH. Jan. 1, 2005, p. 672-678.
Jongsomjit B et al. Role of titania in Ti02-si02 mixed oxides-supported metallocene catalyst during ethylene/1-octene copolymerization. Catalysis Letters vol. 100 Nos. 3-4. Bangkok, Thailand. Apr. 2005. p. 139-146.
Conway Seven J. et al. Chromia/Silica-Titania Cogel Catalysts for Ethene Polymerisation. J. Chem. Soc., Faraday Trans. 1. Dundee, Scotland. 1998. p. 71-78.
Jongsomjit, et al., "Application of Silica/Titania Mixed Oxide-Supported Zirconocene Catalyst for Synthesis of Linear Low-Density Polyethylene", Ind. Eng. Chem. Res. 2005, vol. 44, No. 24, pp. 9059-9063.

* cited by examiner

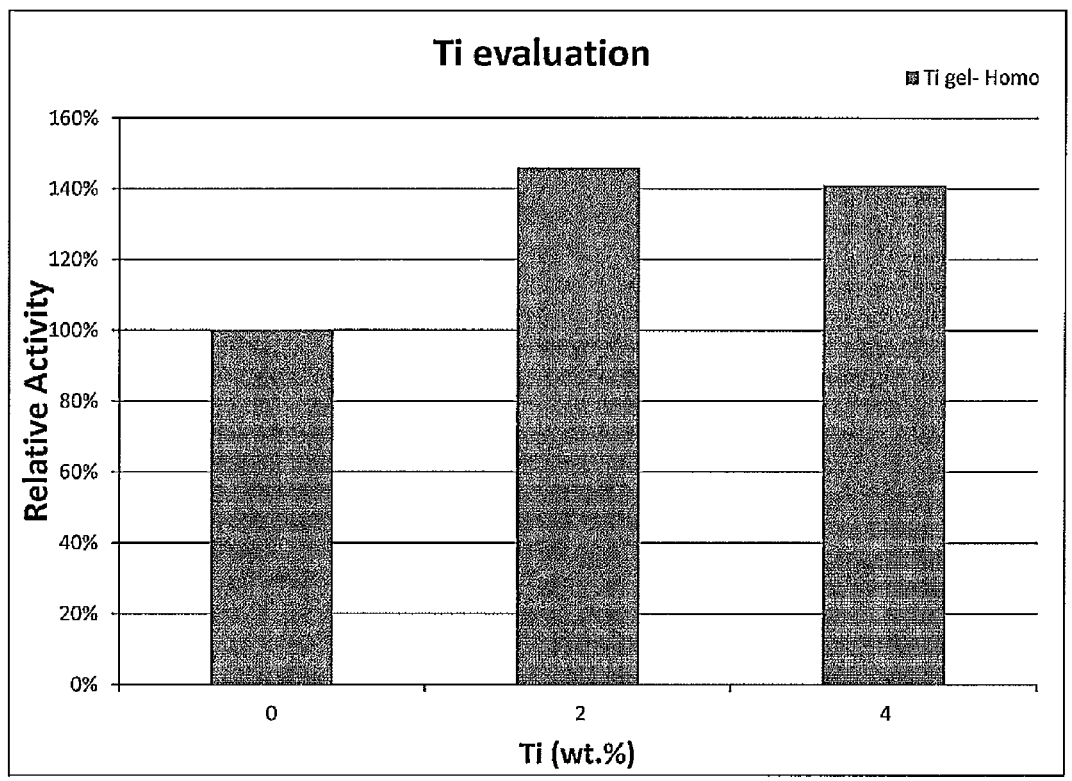

MODIFIED CATALYST SUPPORTS

CROSS-REFERENCE TO RELATED APPLICATIONS

This application claims the benefit of PCT/EP2011/064093, filed Aug. 16, 2011, which claims priority from EP 10172815.2, filed Aug. 13, 2010.

FIELD OF THE INVENTION

The invention relates to a supported catalyst system comprising metallocene catalysts. The invention also relates to the process for preparing the supported catalyst system, as well as a polymerisation process using such a supported catalyst system.

BACKGROUND OF THE INVENTION

Metallocene catalyst systems are extensively used in a variety of polymerisation systems, including the polymerisation of olefins. Generally, in order to obtain the highest activity from metallocene catalysts, it has been necessary to use them with an organoaluminoxane activating agent, such as methylaluminoxane (MAO). This resulting catalyst system is generally referred to as a homogenous catalyst system since at least part of the metallocene or the organoaluminoxane is in solution in the polymerisation media. These homogenous catalyst systems have the disadvantage that when they are used under slurry polymerisation conditions, they produce polymers which stick to the reactor walls during the polymerisation process (generally referred to as "fouling") and/or polymers having small particle size and low bulk density which limit their commercial utility.

Various methods have been proposed in an effort to overcome the disadvantages of the homogenous metallocene catalyst systems. Typically, these procedures have involved the prepolymerisation of the metallocene aluminoxane catalyst system and/or supporting the catalyst system components on a porous carrier (also known as a "particulate solid" or "support"). The porous carrier is usually a silica-containing support.

Another important consideration in the development of metallocene catalysts is the yield of solid polymer that is obtained by employing a given quantity of catalyst in a given amount of time. This is known as the "activity" of the catalyst. There is an ongoing search for metallocene catalysts and techniques for preparing such catalysts which give improved activity for the polymerisation of olefins. An improved activity means that less catalyst needs to be used to polymerise more olefins, thereby reducing the costs considerably, since metallocenes are more expensive than Ziegler-Natta and chromium catalysts.

Several attempts have been made to titanate silica supports for use in metallocene catalysed ethylene polymerisations. Jongsomjit et al. (Molecules 2005, 10, 672, Ind. Eng. Chem. Res. 2005, 44, 9059 and Catalysis Letters Vol. 100, Nos. 3-4, April 2005) discloses the titanation of silicas for zirconocene catalysed ethylene polymerisation, wherein the support is prepared according to Conway et al. (J. Chem. Soc., Faraday Trans. J, 1989, 85(1), 71-78) using mixed supports of titania and silica mixed-oxide supports. The increase in activity with such a support is only of 25%. Under polymerisation conditions, little morphological control can be obtained with such a support. It is particularly difficult to use industrially, since the porous volume, bulk density and particle size of both the silica and titania need to be similar in order to avoid decantation of one with respect to the other. In addition, the interaction of the Ti with the actives sites is not optimized. Furthermore, the zirconocene (metallocene) catalyst is not incorporated into the mixed-oxide support, but added separately into the polymerisation reactor in the presence of 1-hexene, thus during polymerisation.

Fisch et al. discloses immobilization of metallocene within silica-titania by a non-hydrolytic sol-gel method (Applied Catalysis A: General 354 (2009) 88-101). However, the MAO is used as a cocatalyst during the polymerisation process. The MAO and the aluminum thereof does not form an integral part of the support, thereby allowing the formation of large amounts of undesirable TiOH and SiOH on the co-gel.

U.S. Pat. No. 6,395,666 B1 discloses a catalyst composition that comprises an organometallic compound, an organoaluminum compound, and a fluoride solid oxide compound. No alumoxane is added to said composition.

US 2003/0232716 A1 discloses a catalyst composition that comprises an organometal compound, an organoaluminium compound and a treated solid oxide compound. No alumoxane is added to said composition.

U.S. Pat. No. 5,604,170 discloses the use of titanium compounds, in particular titanium tetrachloride, however not in combination with metallocene and alumoxane. None of the disclosed Solid Catalyst Components of the examples show a titania-silica co-precipitated support comprising an alumoxane and a metallocene.

U.S. Pat. No. 5,124,418 discloses silica, alumina or silica-alumina inorganic oxide support that may be employed in combination with magnesia, titania, zirconia and the like. Alumoxanes are not incorporated into the support, but are added separately into the reactor. There is no mention of trying to improve catalyst activities using the presence of titanium.

EP 0 514 594 A1 discloses a catalyst precursor composition supported on a porous carrier comprising a magnesium compound, a zirconium compound and a titanium or vanadium compound. However, the silica and titanium compound are not co-precipitated together.

Thus, a new catalyst support is needed for metallocene catalysts which can induce improved activity of the metallocene catalyst system, particularly under industrial conditions.

An object of the present invention is to provide a new catalyst support for metallocene catalysts to increase their activity.

Furthermore, it is an object of the present invention to provide a new method for polymerising olefins, preferably ethylene and propylene, using a new supported metallocene catalyst system.

SUMMARY OF THE INVENTION

At least one of the objects is solved by the present invention.

The invention concerns a supported catalyst system containing a coprecipitated silica and titania containing support, and further comprising a catalyst activating agent, preferably an alumoxane, wherein the supported catalyst has a Ti content of at least 0.1 wt %.

The supported catalyst system may further comprise a single-site catalyst, preferably a metallocene.

There is also provided a process for preparing a polyolefin comprising the step of polymerising olefins, preferably ethylene or propylene, in the presence of a supported catalyst system according to the invention, preferably in the gas phase or in the slurry phase. Optionally, in the case of ethylene polymerization, the ethylene is copolymerised with one or more alpha-olefin comonomers selected from C3 to C12 alpha-olefins. Optionally, in the case of propylene polymerization, the propylene is copolymerized with one or more alpha olefin comonomers selected from ethylene, and C4 to C12 alpha-olefins.

The polyolefin obtainable by the process of the invention has rheological properties suitable for many applications.

Surprisingly the catalyst support according to the invention improves the activity of the metallocene deposited thereon, since the interaction of the Ti within the support is optimized. It is believed, without being bound to theory, that the titanation step according to the invention by coprecipitation rather than simple physical mixing of oxides, causes the titanium compound to form Si—O—Ti—OH on the surface of the pores within the silica support even before alumoxane (e.g. MAO) addition. Furthermore, by coprecipitation, the titanium is introduced into the framework of the support particles. The interaction between TiOH and SiOH is optimized even before addition of any alumoxane. The electronic effect of the specific Ti distribution on the catalyst grain surface increases the metallocene catalyst system's activity as well.

BRIEF DESCRIPTION OF THE DRAWINGS

FIG. 1 represents a comparison of the catalytic activities of the metallocene catalyst system comprising the titanium compound added according to the invention containing a titanium content of 2 wt % and 4 wt % according to the invention with the catalytic activities of metallocene catalyst systems not containing any titanium.

DETAILED DESCRIPTION OF THE INVENTION

The present invention relates to a process for preparing a supported catalyst system, for preparing the catalyst system prepared with said support and for the production of polyolefins with said catalyst system. The support according to the invention is particularly suitable for metallocene catalyst polymerisations, since it increases the activity of the metallocene catalyst system considerably.

Suitable precursors of titania and silica for the coprecipitated support used in this invention are precursors selected from inorganic and organic compounds of silicon and titanium which it is subsequently convertible to silicon and titanium oxide in the gel.

Suitable precursors of silica are, for example, amorphous silica having a surface area of at least 150 m$^2$/g, preferably of at least 200 m$^2$/g, more preferably of at least 280 m$^2$/g, and at most 800 m$^2$/g, preferably to at most 600 m$^2$/g, more preferably to at most 400 m$^2$/g and more preferably to at most 380 m$^2$/g. The specific surface area is measured by N$_2$ adsorption using the well-known BET technique.), inorganic and organic compounds of silicon such as halides, nitrate, sulfate, oxalate, oxides, alkyl silicates and silicate salts (e.g. sodium silicate). The silica precursor can also be selected from one or more of the group having the general formula $R_nSi(OR')_m$ or $(RO)_nSi(OR')_m$, wherein R and R' are the same or different and are selected from hydrocarbyl groups containing from 1 to 12 carbon, halogens and hydrogen, and wherein n is 0 to 4, m is 0 to 4 and m+n equals 4.

The supported catalyst system comprises at least 20, 40, or 50% by weight of amorphous silica. The silica-titania containing support may also contain one or more of alumina, magnesia, zirconia and the like.

The support of the supported catalyst system is preferably prepared by gelification (i.e. coprecipitation) of the silica precursor with a titanium precursor in solution.

The titanium precursor can be coprecipitated in any form from which it is subsequently convertible to titanium oxide in the gel. Compounds suitable include inorganic and organic compounds of titanium such as halides, nitrate, sulfate, oxalate, alkyl titanates, alkoxides, oxides etc. The final amount of titanium present (the Ti content) in the supported catalyst system is at least 0.1 wt %. The resulting supported catalyst system preferably has a Ti content of from 0.1 to less than 60 wt %, preferably 0.1 to 25 wt %, more preferably 0.5 to 15 wt %, even more preferably 1 to 10 wt %. Most preferably, the Ti content is from 2 to 10 wt %, or even from 3 to 10 wt %.

In another embodiment the titanium precursor is selected from one or more of $R_nTi(OR')_m$ and $(RO)_nTi(OR')_m$, wherein R and R' are the same or different and are selected from hydrocarbyl groups containing from 1 to 12 carbon, halogens, preferably chlorine and fluorine, and hydrogen, and wherein n is 0 to 4, m is 0 to 4 and m+n equals 4. The titanium compound is preferably selected from the group consisting of tetraalkoxides of titanium having the general formula $Ti(OR')_4$ wherein each R is the same or different and can be an alkyl or cycloalkyl group each having from 3 to 5 carbon atoms, and mixtures thereof.

The titanium compound(s) is more preferably selected from alkyl titanates or titanium halides, preferably selected from e.g. $Ti(OC_4H_9)_4$, $Ti(OC_3H_7)_4$ and $TiCl_4$.

The coprecipitation of the titanium precursor and the silica precursor is preformed in solution, preferably in an acidic or basic environment.

The coprecipitated support of the catalyst system can be obtained using the following steps:
a). coprecipitating precursors of titania and silica in solution in order to generate a gel
b). aging the gel
c). washing the gel to remove undesirable salts
d). drying the gel to obtain the coprecipitated silica and titania containing support
e). treating the coprecipitated silica and titania containing support with a catalyst activating agent, preferably alumoxane.

In a preferred embodiment, the coprecipitated support of the supported catalyst system is prepared by first forming a gel by mixing an aqueous solution of the silica precursor with a solution of the titania precursor in a strong acid, e.g. such as sulphuric acid, this mixing being done under suitable conditions of agitation. The concentration of the silica-titania in the gel which is formed is preferably in the range of between 3 to 12 wt % with the pH of the gel preferably being from 3 to 9. A wide range of mixing temperatures can be employed, this range being preferably from above 0° C. to around 80° C.

After gelling, the mixture can be aged. This can be carried out preferably at temperatures within the range of about 20° C. to less than 100° C. Preferably, aging times of at least 10 mins are used, more preferably at least one hour are used.

Following aging, the gel is preferably agitated to produce a slurry which is washed several times with, for example, water and for example, with either an ammonium salt solution or dilute acid to reduce the alkali metal content (the undesirable salts) in the gel to preferably less than about 0.1 weight percent. While various ammonium salts and dilute acid solutions can be employed, the preferred ammonium salts are those, such as ammonium nitrate and ammonium salts of organic acids, which decompose and volatilize upon subsequent drying.

Water is removed from the gel in any suitable manner and preferably by washing with a normally liquid organic compound which is soluble in water, or by azeotropic distillation employing an organic compound e.g. ethyl acetate. Remaining solvents are preferably removed by drying, most preferably in air, at at least 110° C., preferably at least 150° C., more preferably at least 200° C. This step generally lasts for at least 1 hour, more preferably at least 2 hours, most preferably at least 4 hours. The drying can take place in an atmosphere of dry and inert gas and/or air, preferably nitrogen. The drying may be carried out in a fluidised bed.

A coprecipitated silica and titania containing support is obtained from this method, which is used as the support for the supported catalyst system of the invention. However, all other known methods which are generally related to the preparation of gels, cogels, tergels etc can be used to prepare the coprecipitated support suitable according to the invention.

In general, the support advantageously has a pore volume of 1 cm³/g to 3 cm³/g. Supports with a pore volume of 1.3-2.0 cm³/g are preferred. Pore volume is measured by $N_2$ desorption using the BJH method for pores with a diameter of less than 1000 Å. Supports with too small a porosity may result in a loss of melt index potential and in lower activity. Supports with a pore volume of over 2.5 cm³/g or even with a pore volume of over 2.0 cm³/g are less desirable because they may require special expensive preparation steps (e.g. azeotropic drying) during their synthesis. In addition, because they are usually more sensitive to attrition during catalyst handling, activation or use in polymerisation, these supports often lead to more polymer fines production, which is detrimental in an industrial process.

Usually, the particle size of the supported catalyst system D50 is from 5 μm, preferably from 30 μm and more preferably from 35 μm, up to 150 μm, preferably up to 100 μm and most preferably up to 70 μm. D50 is defined as the particle diameter, where 50 wt-% of particles have a smaller diameter and 50 wt-% of particles have a larger diameter. Particle size D90 is up to 200 μm, preferably up to 150 μm, most preferably up to 110 μm. D90 is defined as the particle diameter where 90 wt-% of particles have a smaller diameter and 10 wt-% of particles have a larger diameter. Particle size D10 is at least 2 preferably at least 5 μm. D10 is defined as the particle diameter where 10 wt-% of particles have a smaller diameter and 90 wt-% of particles have a larger diameter. Particle size distribution is determined using light diffraction granulometry, for example, using the Malvern Mastersizer 2000. The particle morphology is preferably microspheroidal to favour fluidisation and to reduce attrition.

The coprecipitated silica and titania containing support can be stored under a dry and inert atmosphere, for example, nitrogen, at ambient temperature.

The details and embodiments mentioned above in connection with the process for manufacturing the catalyst support also apply with respect to the preparation of the supported catalyst system according to the present invention.

The coprecipitated silica and titania containing support can then be treated with a catalyst activating agent. In a preferred embodiment, alumoxane or a mixture of alumoxanes are used as an activating agent for the metallocene, but any other activating agent known in the art can be used e.g. borane compounds. The alumoxane can be used in conjunction with the metallocene in order to improve the activity of the catalyst system during the polymerisation reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

$$R-(Al(R)-O)_x-AlR_2 \quad (III)$$

for oligomeric, linear alumoxanes; or $$(-Al(R)-O-)_y \quad (IV)$$

for oligomeric, cyclic alumoxanes wherein x is 1-40, and preferably 10-20;
wherein y is 3-40, and preferably 3-20; and
wherein each R is independently selected from a $C_1$-$C_8$ alkyl, and preferably is methyl.

In a preferred embodiment, the alumoxane is methylalumoxane (MAO). Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

The treatment of the catalyst support with the alumoxane can be carried out according to any known method known by the person skilled in the art. Advantageously, the alumoxane, preferably MAO, is mixed in an inert diluent/solvent, preferably toluene, with the catalyst support. Alumoxane deposition preferably occurs at a temperature between 60° C. to 120° C., more preferably 80° C. to 120° C., most preferably 100 to 120° C. The amount of MAO is calculated to reach the desired aluminium loading.

The coprecipitated silica and titania containing support is treated with a metallocene either during treatment with the catalyst activating agent (1-pot method) or thereafter. Any metallocene known in the art can be applied, including a mixture of different metallocenes. As used herein, the term "metallocene" refers to a transition metal complex with a coordinated structure, consisting of a metal atom bonded to one or more ligands. The metallocene are used according to the invention is preferably chosen from formula (I) or (II):

$$(Ar)_2MQ_2 \quad (I);$$

or $$R''(Ar)_2MQ_2 \quad (II)$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;
wherein M is a transition metal M selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_1$-$C_{20}$ alkylaryl and $C_7$-$C_{20}$ arylalkyl, or any combinations thereof.

Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, chlorine is preferred.

Exemplary hydrocarboxy groups are methoxy, ethoxy, propoxy, butoxy, and amyloxy.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) are covalently linked or connected by means of a structural bridge. Such a structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

The two Ar can be the same or different. In a preferred embodiment the two Ar are both indenyl or both tetrahydroindenyl wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P. If substituted, both Ar are preferably identically substituted. However, in a preferred embodiment, both Ar are unsubstituted.

In a preferred embodiment, the metallocene used in a process according to the invention is represented by formula (I) or (II) as given above,
wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen and a hydrocarbyl having 1 to 20 carbon atoms as defined herein;
wherein M is as defined above, and preferably is zirconium,
wherein Q is as defined above, and preferably both Q are the same and are selected from the group consisting of chloride, fluoride and methyl, and preferably are chloride; and
and wherein R" when present is as defined above and preferably is selected from the group consisting of a $C_1$-$C_{20}$ alkylene, and a silicon, and wherein said R" is optionally substituted with one or more substituents each independently selected from the group comprising a halogen, hydrosilyl, hydrocarbyl having 1 to 20 carbon atoms as defined herein.

In another preferred embodiment, the metallocene used in a process according to the invention is represented by formula (I) or (II) as given above,
wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of, halogen and a hydrocarbyl having 1 to 20 carbon atoms as defined herein;
wherein M is as defined above, and preferably is zirconium,
wherein Q is as defined above, and preferably both Q are the same and are selected from the group consisting of chloride, fluoride and methyl, and preferably are chloride; and
and wherein R" when present is as defined above and preferably is selected from the group consisting of a $C_1$-$C_{20}$ alkylene, and a silicon, and wherein said R" is optionally substituted with one or more substituents each independently selected from the group comprising a hydrocarbyl having 1 to 20 carbon atoms as defined herein.

In an embodiment, the invention provides a process wherein said metallocene is an unbridged metallocene, In a preferred embodiment, the invention provides a process wherein said metallocene is an unbridged metallocene selected from the group comprising bis(iso-butylcyclopentadienyl)zirconium dichloride, bis(pentamethylcyclopentadienyl)zirconium dichloride, bis(tetrahydroindenyl)zirconium dichloride, bis(indenyl)zirconium dichloride, bis(1,3-dimethylcyclopentadienyl)zirconium dichloride, bis(methylcyelopentadienyl)zirconium dichloride, bis(n-butylcyclopentadienyl)zirconium dichloride, and bis(cyclopentadienyl)zirconium dichloride; and preferably selected from the group comprising bis(cyclopentadienyl) zirconium dichloride, bis(tetrahydroindenyl)zirconium dichloride, bis(indenyl)zirconium dichloride, and bis(1-methyl-3-butyl-cyclopentadienyl)zirconium dichloride.

In another embodiment, the invention provides a process wherein said metallocene is a bridged metallocene.

In a preferred embodiment, the invention provides a process wherein said metallocene is a bridged metallocene selected from the group comprising ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride. Ethylenebis(4,5,6,7-tetrahydro-1-indenyl)zirconium dichloride is particularly preferred.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl) zirconium dichloride, diphenylmethylene (cyclopentadienyl) (fluoren-9-yl)zirconium dichloride, dimethylmethylene (cyclopentadienyl)(2,7-ditert-butyl-fluoren-9-yl)zirconium dichloride, dimethylmethylene[1-(4-tert-butyl-2-methyl-cyclopentadienyl](fluoren-9-yl)zirconium dichloride, diphenylmethylene[1-(4-tert-butyl-2-methyl-cyclopentadienyl)](2,7-ditert-butyl-fluoren-9-yl)zirconium dichloride, dimethylmethylene[1-(4-tert-butyl-2-methyl-cyclopentadienyl)](3,6-ditert-butyl-fluoren-9-yl)zirconium dichloride dimethylmethylene (cyclopentadienyl)(fluoren-9-yl)zirconium dichloride and dibenzylmethylene(2,7-diphenyl-3,6-di-tert-butyl-fluoren-9-yl)(cyclopentadienyl)zirconium dichloride.

The support is treated with the metallocene, advantageously by mixing the desired metallocene(s) with the MAO-modified support. Preferably mixing occurs at room temperature for a duration of at least 15 min, preferably at least 1 hour, more preferably at least 2 hours.

In a particular embodiment, the invention provides a process wherein the molar ratio of aluminum, provided by the alumoxane, to transition metal, provided by the metallocene, of the polymerisation catalyst is between 20 and 200, and for instance between 30 and 150, or preferably between 30 and 100.

The details and embodiments mentioned above in connection with the process for manufacturing the catalyst support and the supported catalyst system also apply with respect to the olefin polymerisation method according to the present invention.

The olefin polymerisation (which includes homo- and copolymerisations) method of the present invention is preferably carried out in the liquid phase (i.e. known as "slurry phase" or "slurry process") or in the gas phase; or in the case of propylene polymerisation also in a bulk process. Combinations of different processes are also applicable.

In a slurry process, the liquid comprises the olefin, either propylene or ethylene, and where required one or more alpha-olefinic comonomers comprising from 2 to 10 carbon atoms, in an inert diluent. The comonomer may be selected from one or more alpha-olefins such as ethylene (when polymerising propylene), 1-butene, 1-hexene, 4-methyl 1-pentene, 1-heptene and 1-octene. Preferably, the comonomer selected is ethylene if polymerising propylene. Preferably, the comonomer selected is 1-hexene when polymerising ethylene. In either case, the inert diluent is preferably isobutane. Preferably, ethylene is polymerized in the presence of a metallocene catalyst system according to the invention in a double loop reactor, i.e, two slurry loop reactors connected in series. In this case, an increase of 100% activity was observed according to the invention in comparison with a non-titanated catalyst support.

The polymerisation process for ethylene is typically carried out at a polymerisation temperature of from 80 to 110° C. and under a pressure of at least 20 bars. Preferably, the temperature ranges from 85 to 110° C. and the pressure is at least 40 bars, more preferably from 40 to 42 bars.

The polymerisation process for propylene is typically carried out at a polymerisation temperature of from 60 to 110° C. and under a pressure of at least 20 bars. Preferably, the temperature ranges from 65 to 110° C., preferably 70° to 100° C., more preferably 65 to 78° C. and the pressure is at least 40 bars, more preferably from 40 to 42 bars.

Other compounds such as a metal alkyl or hydrogen may be introduced into the polymerisation reaction to regulate activity and polymer properties such as melt flow index. In one preferred process of the present invention, the polymerisation or copolymerisation process is carried out in a slurry reactor, e.g. in a liquid-full loop reactor.

The catalyst system of the invention is also particularly suited for gas phase polymerisations of olefins. Gas phase polymerisations can be performed in one or more fluidised bed or agitated bed reactors. The gas phase comprises the olefin to be polymerised, preferably ethylene or propylene, if required one or more alpha-olefinic comonomers comprising 2 to 10 carbon atoms, such as ethylene (when polymerising propylene), 1-butene, 1-hexene, 4-methyl-1-pentene, 1-octene or mixtures thereof and an inert gas such as nitrogen. Preferably, the comonomer selected is 1-hexene when polymerising ethylene. Preferably, the comonomer selected is ethylene if polymerising propylene. In either case, optionally a metal alkyl can also be injected in the polymerisation medium as well as one or more other reaction-controlling agents, for example, hydrogen. Reactor temperature can be adjusted to a temperature of from 60, 65, 70, 80, 85, 90 or 95° C. up to 100, 110, 112 or 115° C. (Report 1: Technology and Economic Evaluation, Chem Systems, January 1998). Optionally a hydrocarbon diluent such as pentane, isopentane, hexane, isohexane, cyclohexane or mixtures thereof can be used if the gas phase unit is run in the so-called condensing or super-condensing mode.

Polypropylene can also be obtained by using the metallocene catalyst system of the invention by polymerizing propylene in a bulk process, e.g. in a loop reactor (Spheripol®) or a continuous stirred-tank reactor (CSTR), or in a Spherizone® process i.e. a multi-zone circulating reactor. Combinations of the above types of processes are also applicable e.g. continuous stirred-tank reactor (CSTR) under bulk conditions, followed by a gas phase reactor.

Surprisingly, it was found that the supported catalyst system according to the invention greatly improves the catalytic activity of metallocene catalyst systems.

In one embodiment, it was found that the catalytic activity of a metallocene catalyst system for ethylene polymerisations even increased up to 70% by using the Ti-impregnated support according to the invention, in comparison with a non-titanated support. In comparison with a support impregnated with Ti having a Ti content of over 12 wt %, the activity increased by 30 to 40%. When polymerising ethylene, the polyethylene obtained with the catalyst system of this invention can have a molecular weight distribution (MWD) that is represented by the dispersion index D i.e. Mw/Mn (weight average molecular weight/number average molecular weight, measured by GPC analysis) of typically from 2 to 10, more typically of 3 to 8, a density measured according to ISO 1183 typically from 0.920 up to 0.970 g/cm$^3$ and a melt flow index (MI$_2$) measured according to ISO 1133, condition D, at 190° C. and 2.16 kg typically from 0.1 to 50 g/10 min, preferably 0.1 to 30 g/10 min.

When polymerising propylene, the polypropylene obtained with the catalyst system of this invention can have a density measured according to ISO 1183 typically from 0.920 up to 0.970 g/cm$^3$ and a melt flow index (Mb) measured according to ISO 1133, condition L, at 230° C. and 2.16 kg, in the range from 0.05 g/10 min to 2000 g/10 min.

The polyolefins obtained using the catalyst system of the invention can be used in any application known to the person skilled in the art.

The following Examples are given to illustrate the invention without limiting its scope.

EXAMPLES

Supported Catalyst System "Catalyst Z1"

1. Support Modification

In a 150 mL round bottom flask, 4.0 g of TMOS (tetramethoxysilane) and 0.28 g TNBT (titanium n-butoxide)

were added drop by drop in a 50 ml aqueous solution of $H_2SO_4$ (pH=3) stirred at 60 rpm and heated at 70° C. After 2 hours, the mixture was aged at 60° C. for 24 hours. After aging, the gel was washed with 5% ammonium nitrate solution and 5 times with distilled water. Water was extracted from the gel by azeotropic distillation in ethyl acetate and the remaining solvent was removed by drying in nitrogen at 450° C. for 4 h, thereby providing the coprecipitated silica and titania containing support.

2. MAO Treatment 20 g of dried silica was introduced in a 500 mL round-bottomed flask. Toluene was added and the suspension was stirred at 100 rpm. MAO (30 wt. % in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight 3. Metallocene Treatment In 250 mL round bottom flask, 9.8 g of the above-obtained SMAO silica was suspended in 80 mL toluene. Then, 0.2 g of ethylene-bis(4,5,6,7-tetrahydro-1-indenyl)zirconium dichloride in a suspension of 20 mL of toluene was added to the suspended silica-containing support. The resulting suspension was stirred at 100 rpm for 2 hours at room temperature. Finally, the obtained catalyst was filtered, washed with toluene and pentane before being dried overnight.

Supported Catalyst System "Catalyst Z2"

1. Support Modification

In a 150 mL round bottom flask, 4.0 g of TMOS (tetramethoxysilne) and 0.56 g TNBT (titanium n-butoxide) were added drop by drop in a 50 ml aqueous solution of $H_2SO_4$ (pH=3) stirred at 60 rpm and heated at 70° C. After 2 hours, the mixture was aged at 60° C. for 24 hours. After aging, the gel was washed with 5% ammonium nitrate solution and 5 times with distilled water. Water was extracted from the gel by azeotropic distillation in ethyl acetate and the remaining solvent was removed by drying in nitrogen at 450° C. for 4 h, thereby providing the coprecipitated silica and titania containing support.

2. MAO Treatment 20 g of dried silica was introduced in a 500 mL round-bottomed flask. Toluene was added and the suspension was stirred at 100 rpm. MAO (30 wt. % in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight 3. Metallocene Treatment In 250 mL round bottom flask, 9.8 g of the above-obtained SMAO silica was suspended in 80 mL toluene. Then, 0.2 g of ethylene-bis(4,5,6,7-tetrahydro-1-indenyl)zirconium dichloride in a suspension of 20 mL of toluene was added to the suspended silica-containing support. The resulting suspension was stirred at 100 rpm for 2 hours at room temperature. Finally, the obtained catalyst was filtered, washed with toluene and pentane before being dried overnight.

Supported Catalyst System "Catalyst C1"

1. Support Modification

Silica support was dried under a nitrogen flow at 450° C.

2. MAO Treatment

MAO was mixed in toluene with the modified support at 110° C. After filtration, the recovered powder was washed and dried overnight to obtain the MAO-modified support.

3. Metallocene Treatment

The metallocene ethylene-bis(4,5,6,7-tetrahydro-1-indenyl)zirconium dichloride was stirred with the MAO-modified support at room temperature for 2 hours. After filtration, the recovered powder was washed and dried overnight to obtain the supported catalyst system. No titanation was carried out.

Polymerisations

Polymerisations of ethylene were carried out with "Catalyst Z1" and "Catalyst Z2" and compared with polymerisations of ethylene using "Catalyst C1" under the same reaction conditions.

The catalyst system was injected in a 130 mL reactor containing 75 mL of isobutane under an ethylene pressure of 23.8 bars at 85° C. for copolymerization with a concentration of 2.4 wt. % hexene.

FIG. 1 shows the comparison of the catalytic activity between the different runs, "Catalyst C1" being the comparative example. As presented, the supported catalyst system with the coprecipitated support according to the invention provides increased activities. A weight percentage of only 2 wt % or 4 wt % of Ti increased the catalytic activity by 46% and 41% respectively compared to the Catalyst C1.

Polymerisations of ethylene were carried out with "Catalyst Z1" and compared with polymerisations of ethylene using "Catalyst C1" on a ADL (Advanced Double Loop) process. Catalyst Z1 showed 94% higher catalyst activity in comparison to "Catalyst C1".

The invention claimed is:

1. A supported catalyst system comprising a coprecipitated silica- and titania-containing support comprising an alumoxane and at least one metallocene, wherein the supported catalyst system has a Ti content of from 0.1 wt % to 10 wt %, and wherein the alumoxane is deposited on the coprecipitated silica- and titania-containing support.

2. The supported catalyst system according to claim 1, wherein the alumoxane is an oligomeric, linear or cyclic alumoxane selected from

$$R-(Al(R)-O)_x-AlR_2 \qquad (III)$$

for oligomeric, linear alumoxanes; or

$$(-Al(R)-O-)_y \qquad (IV)$$

for oligomeric, cyclic alumoxanes wherein x is 1-40; wherein y is 3-40; and wherein each R is independently selected from a $C_1$-$C_8$ alkyl.

3. The supported catalyst system according to claim 1, wherein a molar ratio of aluminum, provided by the alumoxane, to transition metal, provided by the at least one metallocene, of the supported catalyst system is between 20 and 200.

4. The supported catalyst system according to claim 1, wherein the coprecipitated silica- and titania-containing support is an MAO-modified support, wherein MAO is methylaluminoxane.

5. A process for preparing a supported catalyst system comprising a coprecipitated silica- and titania-containing support comprising an alumoxane and at least one metallocene, wherein the supported catalyst system has a Ti content of from 0.1 wt % to 10 wt %, the process comprising the following steps:
a) coprecipitating precursors of titania and silica in solution in order to generate a gel;
b) aging the gel;
c) washing the gel to remove undesirable salts;
d) drying the gel to obtain the coprecipitated silica and titania containing support; and
e) treating the coprecipitated silica and titania containing support with the alumoxane.

6. The process according to claim 5, wherein the precursor of titania is selected from one or more of the compounds having the general formula $R_n Ti(OR')_m$ or $(RO)_n Ti(OR')_m$, wherein R and R' are the same or different and are selected from the group consisting of hydrocarbyl groups containing from 1 to 12 carbon, halogens and hydrogen, and wherein n is 0 to 4, m is 0 to 4 and m+n equals 4.

7. The process according to claim 5, wherein the precursor of titania is selected from one or more of the group consisting of tetraalkoxides of titanium having the general formula $Ti(OR')_4$ wherein each R is the same or different and is an alkyl or cycloalkyl group each having from 3 to 5 carbon atoms.

8. The process according to claim 5, wherein the precursor of silica is one or more selected from the group consisting of silicate salts and compounds having the general formula $R_n Si(OR')_m$ or $(RO)_n Si(OR')_m$, wherein R and R' are the same or different and are selected from the group consisting of hydrocarbyl groups containing from 1 to 12 carbon, halogens and hydrogen, and wherein n is 0 to 4, m is 0 to 4 and m+n equals 4.

9. The process according to claim 5, wherein treating the coprecipitated silica and titania containing support with the alumoxane comprises depositing the alumoxane on the coprecipitated silica and titania containing support.

10. The process according to claim 9, wherein treating the coprecipitated silica and titania containing support with the alumoxane comprises mixing the alumoxane in an inert diluent/solvent with the coprecipitated silica and titania containing support, wherein alumoxane deposition occurs at a temperature between 60° C. and 120° C.

11. The process according to claim 5, further comprising treating the coprecipitated silica and titania containing support with the at least one metallocene either during treatment with the alumoxane or after treatment with the alumoxane.

12. A supported catalyst system comprising a coprecipitated silica- and titania-containing support comprising an alumoxane and at least one metallocene, wherein the supported catalyst system has a Ti content of from 0.1 wt % to 10 wt %;
wherein the at least one metallocene is selected from formula (I) or (II):

  (I)

  (II)

wherein the metallocenes according to formula (I) are non-bridged metallocenes and the metallocenes according to formula (II) are bridged metallocenes;
wherein said metallocene according to formula (I) or (II) has two Ar bound to M which are the same or different from each other;
wherein Ar is an aromatic ring, group or moiety and wherein each Ar is selected independently from an indenyl or a tetrahydroindenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group consisting of B, Si, S, O, F and P;
wherein M is a transition metal selected from the group consisting of titanium, zirconium, hafnium and vanadium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group consisting of B, Si, S, O, F and P; and
wherein R" is a divalent group or moiety bridging the two Ar groups and is selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of a hydrocarbyl having 1 to 20 carbon atoms and wherein said hydrocarbyl optionally contains one or more atoms selected from the group consisting of B, Si, S, O, F and P.

13. A process for preparing a polyolefin comprising the step of polymerising an olefin in the presence of a supported catalyst system comprising a coprecipitated silica- and titania-containing support comprising an alumoxane and at least one metallocene, wherein the supported catalyst system has a Ti content of from 0.1 wt % to 10 wt %, wherein polymerization is carried out in a gas phase reactor and/or in a slurry phase reactor.

14. The process according to claim 13, wherein the olefin is ethylene or propylene.

15. The process of claim 13, wherein the polyolefin is polyethylene having a molecular weight distribution (Mw/Mn) measured by GPC analysis of from 2 to 10; a density measured according to ISO 1183 of from 0.920 to 0.970 g/cm³; and a melt flow index ($MI_2$) measured according to ISO 1133, condition D, at 190° C. and 2.16 kg of from 0.1 to 50 g/10 min.

16. A process for preparing a polyolefin comprising the step of polymerising an olefin in the presence of a supported catalyst system comprising a coprecipitated silica- and titania-containing support comprising an alumoxane and at least one metallocene, wherein the supported catalyst system has a Ti content of from 0.1 wt % to 10 wt %, wherein the polyolefin is polypropylene and wherein the process comprises the step of polymerising propylene in a bulk process.

17. A process for preparing a polyolefin comprising the step of polymerising an olefin in the presence of a supported catalyst system comprising a coprecipitated silica- and titania-containing support comprising an alumoxane and at least one metallocene, wherein the supported catalyst system has a Ti content of from 0.1 wt % to 10 wt %, wherein the polyolefin is polypropylene having a density measured according to ISO 1183 of from 0.920 to 0.970 g/cm³; and a melt flow index (Mb) measured according to ISO 1133, condition L, at 230° C. and 2.16 kg, of from 0.05 g/10 min to 2000 g/10 min.

* * * * *